United States Patent

Walther

[15] 3,640,688
[45] Feb. 8, 1972

[54] CARBON MONOXIDE MEASURING METHOD AND DEVICE

[72] Inventor: Eric G. Walther, Jonesville, N.Y.
[73] Assignee: Environment/One Corporation, Latham, N.Y.
[22] Filed: Sept. 15, 1969
[21] Appl. No.: 857,741

[52] U.S. Cl. ........................23/232 R, 23/232 E, 23/254 E, 356/37
[51] Int. Cl. ......................................G01n 1/00, G01n 31/02
[58] Field of Search ................23/232, 232 E, 254 E; 356/37, 356/39

[56] References Cited

UNITED STATES PATENTS 3,198,721  8/1965  Rich.....................................23/232 X

*Primary Examiner*—Morris O. Wolk
*Assistant Examiner*—R. M. Reese
*Attorney*—Charles W. Helzer

[57] ABSTRACT

A method and apparatus for measuring trace amounts of carbon monoxide in a sample gas. The technique comprises filtering a specimen portion of a sample gas to free it of condensation nuclei. The filtered, carbon monoxide-bearing gas specimen is then reacted with a polymer to induce thermoparticulate production of consideration nuclei from the polymer. To enhance the thermoparticulate production of the condensation nuclei, the polymer is heated to a temperature value just below that required for appreciable thermoparticulate production due to thermal agitation alone. In the presence of carbon monoxide, thermoparticulate production of condensation nuclei is enhanced and proves a measure of quantity of carbon monoxide present in the gaseous specimen. By suitably controlling the temperature to which the polymer is heated the CO-measuring device can be made sensitive to a wide range of carbon monoxide concentration. A preferred apparatus in accordance with the invention includes a scale range changing arrangement for adapting the indicator of the condensation nuclei meter to operate over a wide range of particle concentrations together with means for simultaneously operating the scale range changing function with changes in temperature of the reactant polymer whereby for increasing CO concentrations the reactant temperature is lowered and the scale of the indicator is adjusted to read higher CO concentrations. The polymeric material which may be employed as a reactant is from the group consisting of styrene divinyl benzene copolymer, polyethylene, chlorinated polystyrene and copolymer of styrene. The polymeric material preferably is in the form of finely divided, globular beads and the filtered, CO-bearing gas specimen to be reacted is passed over the surface of the beads in a manner to maximize surface exposure of the polymeric material to the gas specimen.

16 Claims, 3 Drawing Figures

SIGNAL TO NOISE RATIO OF CO DETECTION SYSTEM
AS A FUNCTION OF CO CONCENTRATION

MAXIMUM SENSITIVITY AS A FUNCTION OF REACTANT TEMP.

INVENTOR
ERIC G. WALTHERS

BY          CHARLES W. HELZER
                    ATTORNEY

CARBON MONOXIDE MEASURING METHOD AND DEVICE

BACKGROUND OF INVENTION

1. Field of Invention

This invention relates to a new and improved method and apparatus for detecting the presence of carbon monoxide (CO) in gaseous atmospheres.

More particularly, the invention relates to a method and apparatus for detecting and measuring the amount of CO gas present in an atmosphere where such gas may be present in amounts ranging from quite high concentrations to very dilute concentrations on the order of 10 parts per billion (10 p.p.b.) of CO to other gaseous constituents.

2. Statement of Prior Art Problem

Carbon monoxide (CO) is continuously being injected into the troposphere by many sources such as transportation vehicles, industrial and home heating, refuse burning, and the like. The production rate of CO has been estimated by investigators to be on the order of $4 \times 10^{-4}$ grams per square centimeter per year. If this estimation is accurate, then it would result in adding about four times the present measured amount of CO to the troposphere each year assuming that there is no increase in the production rate of CO, that there is no loss of CO from the troposphere and that there is sufficient mixing of the CO to produce a uniform concentration throughout the troposphere. However, such increases in the content of CO concentration in the troposphere has not been observed which logically leads to the question "By what means is CO removed from troposphere?" Speculation may lead to such answers as removal by a gas-phase reaction process, rain-out and washout, and the like. To provide satisfactory answers to this question, measurement of CO distribution in the troposphere and its time variation, would be desirable.

Measurement of the CO concentration in the atmosphere is difficult because there are no suitable instruments capable of measuring the very low concentrations found in the cleaner parts of the troposphere such as the North Pacific Maritime air having a CO concentration of 0.03 p.p.m. The only continuous CO meter described in the literature that has a sensitivity to less than 0.1 part per million utilizes the reduction of red mercuric oxide wherein the amount of mercury vapor released by the reduction of the oxide is measured and is proportional to the CO concentration. Such an instrument was described by Robbins, Borg and Robinson in 1967 in a paper entitled "Carbon Monoxide in the Atmosphere" presented at the 60th Annual Meeting of the Air Pollution Control Association in Cleveland, Ohio - Paper No. 67-28. While this instrument is continuous and adequately sensitive for the investigation of tropospheric CO concentrations, it still possesses many problems of operation and calibration which prevents its use in areas of polluted air where possible interfering gases are present.

A number of detecting and measuring instruments have been developed and sold in the past for both sensing and/or measuring minute quantities of a trace gas with a condensation nuclei meter which has a projected sensitivity on the order of 1 part in $10^{14}$. Condensation nuclei is a generic name given to small airborne particles which are characterized by the fact that they serve as the nucleus on which water will condense as in a fog or cloud. Such condensation nuclei may have particle sizes lying in a size range extending from slightly above molecular size on the order $1 \times 10^{-8}$ centimeters in radius to $1 \times 10^{-4}$ centimeters in radius, although the most significant portion of condensation nuclei numerically lie in the size range between $5 \times 10^{-5}$ and $5 \times 10^{-7}$ centimeters in radius.

The method by which known condensation nuclei meters operate relies on the property of condensation nuclei particles to act as the nucleus of a water droplet. If a sample of air or other gaseous atmosphere containing condensation nuclei is drawn into a chamber and its relative humidity brought up to 100 percent, adiabatic expansion of the gaseous sample will cause the relative humidity to rise instantaneously to a value greater than 100 percent. The moisture in the air will then tend to condense about the condensation nuclei particles as centers. These particles then grow, due to the condensation of the water about them from the original submicroscopic size to the size of fine fog droplets which then may be measured by known light-scattering and light absorption techniques. It is this growth of water about the particle that gives the necessary magnification to obtain a detectable sensitivity on the order of 1 part by weight in $10^{14}$ parts by weight of air for small particles. One such condensation nuclei meter has been described in U.S. Pat. No. 2,684,008, issued July 20, 1954, to Bernard Vonnegut.

U.S. Pat. No. 2,897,059, issued July 28, 1959, for "Process and Apparatus for Gas Detection," Frank W. Van Luik, inventor, describes a method and apparatus for detecting gaseous carbon compounds such as carbon monoxide and carbon dioxide ($CO_2$). This apparatus has an extremely high order of sensitivity and employs a condensation nuclei meter in conjunction with a conversion apparatus that converts gaseous carbon compounds to metallic carbonyls that then are sensed and measured by the condensation nuclei meter. The process and apparatus described in U.S. Pat. No. 2,897,059, is quite satisfactory for many purposes; however, this instrument is capable of detecting only the total concentration of CO and $CO_2$ and has no ability to discriminate between the two gases. What is desired at this stage of development in the art for the reasons enumerated above, is a method and apparatus which detects only CO and will not respond to $CO_2$ or other interfering gases even in rather high concentration on the order of 1 part in a hundred (1 percent).

SUMMARY OF INVENTION

It is therefore a primary object of the invention to provide a new and improved method and apparatus for detecting and measuring the presence of CO in the gaseous atmospheres.

Another object of the invention is to provide such a method and apparatus which employs a condensation nuclei meter in conjunction with a heated reactant polymer in a conversion stage, and which is extremely sensitive and capable of continuous operation over a wide range of CO concentrations.

In practicing the invention, a method and apparatus for detecting carbon monoxide in a sample gas is provided. This method and apparatus employs filtering a specimen portion of a sample gas to free it of naturally occurring condensation nuclei. The filtered, carbon monoxide bearing gaseous specimen is then reacted with a reactant polymeric material to induce thermoparticulate production of condensation nuclei from the polymer. Many materials such as plastics when they are heated sufficiently will emit numerous particles due to thermoagitation which can serve as condensation nuclei. Such emission has been termed "thermoparticulate production" by early investigators, C.B. Murphy and C.D. Doyle in a paper entitled "Thermoparticulate Analysis" presented in 1966 at the Applied Polymer Symposium No. 2 and appears in the report of that symposium on pages 77–83. The condensation nuclei particles induced by thermoparticulate production in the presence of the CO-bearing gas specimens are then detected and measured by a condensation meter in a conventional manner. The number of condensation nuclei produced and counted provides a measure of the quantity of CO gas present in the specimen being analyzed. The reactant polymer is heated to a temperature just below that required for appreciable thermoparticulate production due to thermal agitation alone. It is preferred that the temperature to which the reactant polymer is heated, be controlled in accordance with the concentration of CO present in the sample gas. For this purpose, a temperature-controlling means and scale range changing means of the indicator of the condensation nuclei meter are interconnected whereby scale range change is achieved automatically with changes in temperature of the reactant polymeric material in a manner such that for increasing CO concentrations the reactant temperature is lowered and the scale of the indicator means is adjusted to read higher CO concentrations.

The reactant polymeric material preferably is selected from the group consisting of styrene divinyl benzene copolymer, polyethylene, chlorinated polystyrene and copolymer of styrene. It is also preferred that the polymeric material be in the form of finely divided globular beads and the filtered CO-bearing gas specimen to be reacted is passed over the surface of the beads in a manner to maximize surface exposure of the polymeric material to the gas specimen.

BRIEF DESCRIPTION OF DRAWINGS

Other objects, features and many of the attendant advantages of this invention will be appreciated more readily as the same becomes better understood by reference to the following detailed description, when considered in connection with the accompanying drawings, wherein.

DETAILED DESCRIPTION OF PREFERRED EMBODIMENTS

Figure 1:
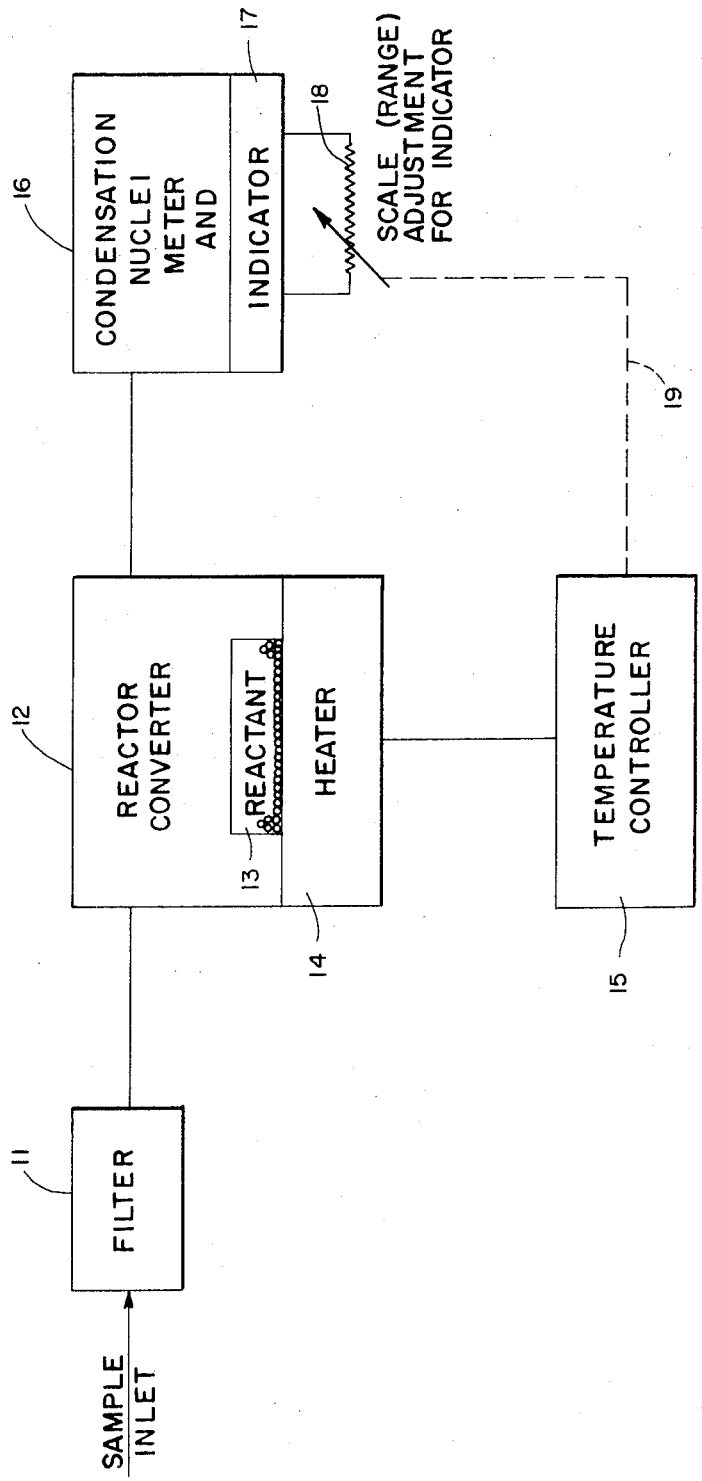
FIG. 1 is a functional block diagram of a new and improved apparatus for carrying out the novel method of detecting carbon monoxide in accordance with the invention.

FIG. 1 is a schematic block diagram of an apparatus for performing the novel CO-detecting method in accordance with the invention. As shown in FIG. 1, a suitable sample inlet device, such as an airscoop, the outlet of a blower fan, etc., supplies a specimen of a gaseous atmosphere being sampled for CO content to the input side of a filter 11. The filter 11 may comprise any conventional filter structure such as those employing fiber glass or some other similar suitable fibrous material, such as glass wool, a standard Gelman-type filter or other known arrangement for freeing the gaseous sample of naturally occurring or other condensation nuclei particles entrained in the sample. While the design of filter 11 is not critical, it is somewhat important in that its efficiency determines the noise level of the overall measuring system.

The outlet side of filter 11 is connected to and supplies the filtered, CO-bearing gaseous sample to the input of a reactor/converter chamber 12 having a reactant 13 disposed therein. The reactant 13 is heated to a desired temperature by a suitable heater 14 controlled by a temperature controller 15. In the reactor/converter chamber 12, the inlet, filtered, CO-bearing gaseous sample reacts with the heated reactant 13 in a surface reaction to induce "thermoparticulate production" of condensation nuclei particles. The condensation nuclei particles thus produced then are supplied to a condensation nuclei meter 16 of conventional construction having an indicator 17 for providing an output, observable indication of the number of condensation nuclei particles produced in the reactor/converter chamber 12. As will be discussed more fully hereinafter, the number of condensation nuclei particles produced in the reactor/converter chamber 12 is proportional to the quantity of CO contained in the gaseous sample supplied through filter 11 to the inlet side of the reactor/converter chamber. Accordingly, the indication provided by the condensation nuclei meter 16 is a direct measure of the quantity of CO contained in the gaseous atmosphere being monitored.

The reactant 13 employed in the reactor/converter chamber 12 is a heated polymer. It has been demonstrated by Murphy and Doyle in the above-referenced 1966 article that many materials such as plastics emit numerous particles that can serve as condensation nuclei when they are heated sufficiently. The emission of such particles has been defined as "thermoparticulate production," and the present inventor has determined that such "thermoparticulate production" can be greatly influenced by the presence of CO. To be particular, it has been determined that CO enhances "thermoparticulate production" of certain polymers.

A comprehensive theory of the phenomenon whereby CO enhances "thermoparticulate production," is not known at this time. However, it is thought that the CO breaks the long-chain polymer molecules. The resulting shorter chain fragments escape from the bulk polymer into the gas phase and serve as condensation nuclei. This hypothesis views the effect of CO as a surface reaction and not as a gas phase reaction with the polymer vapor. The operation is maintained by heating the polymer reactant 13 to a temperature such that it is just about to commence thermoparticulate production. If CO is present in the sample gas being monitored, condensation nuclei will be produced in a concentration that increases as the CO concentration increases. It is believed that the thermal energy provided by heating the polymer reactant 13 weakens the bonds of the molecules of the polymer to just below the breaking point at a given operational temperature. Then, if CO molecules are present in the atmosphere in which the reactant polymer is heated, the CO molecules will bombard the weakened bonds so that they are broken at a rate proportional to the CO concentration. To provide adequate control over the heating of the reactant polymer 13, it is desirable that the heating element 14 be designed to control the polymer surface temperature to + or −0.5° C. There are a number of conventional, commercially available electric heaters and temperature control circuits for such heaters for use as the elements 14 and 15.

The condensation nuclei meter 16 and indicator 17 may comprise a conventional, commercially available condensation nuclei meter such as that described in the above-referenced U.S. Pat. No. 2,684,008, issued July 20, 1954, to Bernard Vonnegut. It is preferred, however, that the condensation nuclei meter constitute one of the continuously operable types such as that described in an article entitled "Cloud Chamber for Counting Nuclei in Aerosols" by Bernard G. Saunders, published *Review of Scientific Instruments*, vol. 27, No. 5, May, 1956, pages 273–277. The condensation nuclei meter described in the *Review of Scientific Instruments* article, employs periodically actuated solenoid valves which control the admission of humidified condensation nuclei-bearing gas to an expansion chamber evacuated by a vacuum pump that draws the gaseous sample through the apparatus and the entire measuring system. In the condensation nuclei meter 16, droplet clouds are formed about the condensation nuclei particles as centers which are detected electro-optically to provide an output indication on indicator 17 of the number of particles entrained in the gaseous sample. The instrument has the ability automatically and continuously to measure condensation nuclei as small as $5 \times 10^{-7}$ centimeters in radius over a concentration range from 50 cm.$^{-3}$ to $10^7$ cm.$^{-3}$. Indicator 17 preferably includes a scale range changing variable resistor 18 for changing the scale or sensitivity of an output amplifier comprising a part of the indicator 17 circuitry. By this means, the indicator 17 can be made to respond to a wide range of condensation nuclei particle concentration and this in turn allows the overall system sensitivity to be adjusted so that it can respond to a wide range of CO concentrations in the atmosphere being sampled.

The entire arrangement can be set up to operate automatically and continuously to monitor selected points in the troposphere and provide a continuous output indication of the CO content of gaseous atmospheres being monitored over a wide range of CO concentrations. The maximum sensitivity of which the CO-measuring device is capable, is about 10 parts per billion (10 p.p.b.), and by appropriate adjustment of the temperature of the reactant polymer 13 together with adjustment of the instrument sensitivity through the scale changing resistor 18, the device can be made to respond to concentrations up to 100 percent of CO, as explained hereinafter.

Figure 2:
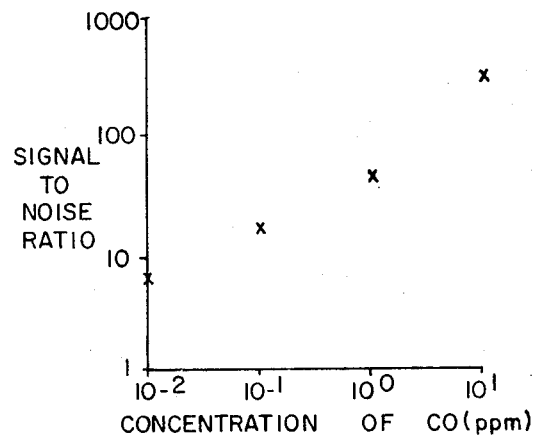
FIG. 2 is a plot of the signal-to-noise ratio obtained from the apparatus of FIG. 1 plotted as a function of the CO concentration.

FIG. 2 of the drawings is a plot of the signal-to-noise ratio of the CO-measuring device plotted as a function of the CO concentration measured in parts per million (p.p.m.). From a consideration of FIG. 2, it will be seen that the signal-to-noise ratio of the device increases significantly with increasing concentration of CO.

Figure 3:
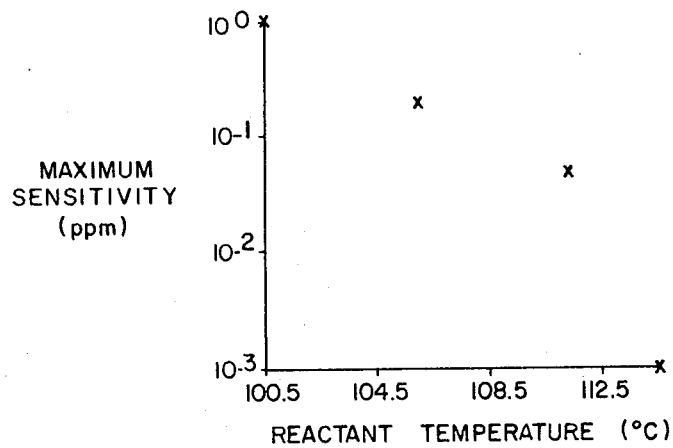
FIG. 3 is a plot of the maximum sensitivity measured in parts per million plotted as a function of the temperature of the reactant polymeric material employed in the conversion stage of the apparatus.

FIG. 3 of the drawings is a plot of the maximum sensitivity of the CO-measuring device (calibrated in terms of parts per million) plotted against the temperature of the reactant polymer 13 measured in degrees centigrade. From a consideration of FIG. 3, it will be seen that maximum sensitivity is achieved when the reactant polymer 13 is kept at the highest temperature possible without appreciable thermoparticulate production due to thermal agitation alone. By maintaining this operating condition, maximum signal-to-noise ratio can be obtained for any CO concentration. If the CO concentration of a gaseous sample being monitored rises so high that the resulting aerosol concentration cannot be measured by the condensation nuclei meter 16, then the temperature of the reactant polymer 13 must be lowered until the aerosol concentration is decreased to a measurable value. Thus, it will be seen that the calibration of the instrument depends upon the reactant temperature. To assure proper calibration of the instrument an interconnecting means shown by the dotted line 19, is provided for automatically adjusting the scale-changing resistor 18 in accordance with changes in the setting of the temperature controller 15. By this arrangement, for increasing CO concentrations, as the reactant temperature is lowered, the scale of the indicator means 17 automatically is adjusted to read the higher CO concentrations. By thus temperature controlling the reactant polymer 13 and adjusting the scale or range of indicator 17, CO concentrations ranging from 0.01 p.p.m. to 100 percent can be measured.

In one practical embodiment of the method and device shown in FIG. 1, the reactant polymer 13 was comprised by Xerox developer beads designed for the Xerox 914 copier and which are believed to comprise a copolymer of styrene. The polymer beads were placed in a 250 milliliter filtering flask and the reactant temperature range varied between 90° to 110° C. With this system, CO content in a carrier gas as dilute as 10 parts per billion (and even 1 p.p.b.) of CO were detected. The gaseous samples being tested for CO content were directed over a layer of the polymer beads placed in the bottom of the heated flask. The dilute sample gases containing CO were obtained with a hypodermic syringe used to add CO to sample air entering the system. The syringe was partially emptied and refilled with a CO-free carrier gas several times in order to obtain the low CO concentrations measured. The most sensitive detection is obtained when the polymer is heated to the temperature at which it begins thermoparticulate production and any lower temperature lowers the sensitivity. However, by lowering the sensitivity in this manner, the system can be allowed to measure higher concentrations of CO.

Another polymer reactant that may be used as the reactant element 13 in FIG. 1 is styrene divinyl benzene copolymer that is supplied commercially by the Dow Chemical Company. The optimum operating temperature of this reactant polymer is 85° C. Another reactant polymer is polyethylene supplied in the form of beads under the trade name "Microthene" by the U.S. Industrial Chemical Company. This reactant polymer operates best at a temperature of 80° C. Still another suitable polymer reactant is a fire-retardant material known as Bradford Fire Retardant Snow sold by the Bradford Corporation and is of unknown composition but it is believed to constitute a chlorinated polystyrene. This material operates best at 101° C. A still further polymer reactant is the plastic of unknown composition supplied by the Continental Can Company and believed to be polystyrene of the type used in fabricating its commercial cups such as the 91P tumbler. The optimum operating temperature of this material is 100° C. The temperatures quoted above for the different specific reactant polymers listed, are given to the nearest degree since it is desirable that the temperature be held at the specific values noted plus or minus 1° C. in order to achieve maximum sensitivity. The particular values quoted are based on a particular temperature-measuring apparatus and configuration and may differ somewhat for a differently calibrated apparatus. However, it is believed that the temperature range cited above encompasses the most practical and workable temperature range for various polymeric materials that can be employed as the reactant 13.

In order to ascertain the validity of the novel method and apparatus herein described, the system was tested for possible interference with other gases normally found in the atmosphere by exposing the same polymer reactants employed with CO to these other gases. The gases thus tested along with the concentration in parts per million of each gas that must be exceeded to produce interference, is given in the first column in Table 1. The second column in Table 1 lists the normal concentration of these possible interfering gases as they occur in air in parts per million. From a comparison of Column 1 to Column 2, it will be seen that in order for these other gases to produce an interfering effect they must greatly exceed by at least an order of magnitude the concentration of these gases normally occurring in the troposphere.

Concentration of Various Gases that must be exceeded to produce Interference with the CO Detector

| Gas | Concentration (p.p.m.) | Concentration in air (p.p.m.) |
| --- | --- | --- |
| Sulfur dioxide | 10 | 1 |
| Ammonia | 100 | <0.2 |
| Hydrogen sulfide | 100 | 0.006 |
| Hydrogen | 100 | 0.5 |
| Chlorine | 100 | 0.0003 |
| Nitric oxide | 100 | <0.02 |
| Ethylene | 100 | ? |
| Nitrogen dioxide | 1,000 | 0.02 |
| Nitrous oxide | 10.000 | 0.5 |
| Methane | 10,000 | 2 |
| Butane | 10,000 | ? |

From the foregoing description, it can be appreciated that the novel CO-measuring method and device possesses excellent sensitivity and selectivity and is capable of achieving continuous measurement of CO concentration in the troposphere using gas to condensation nuclei conversion techniques. The measurable range of CO concentration is from 0.01 p.p.m. (10 p.p.b.) to 100 percent, and this range can be obtained by controlling the temperature of the reactant polymer. The mechanism by which the CO enhances thermoparticulate production from the surface of the reactant polymer is hypothesized to be one of breaking the long-chain polymer molecules by the CO molecules under conditions where the interatomic bonds in the polymer molecular chain are sufficiently weakened by thermal agitation. Negligible interference effect is found from exposure of the novel method and apparatus to several pollutant gases normally found in the atmosphere.

It will be appreciated, therefore, that the invention provides a new and improved method and apparatus for detecting and measuring the presence of CO in gaseous atmospheres. The method and apparatus employs a condensation nuclei meter in conjunction with a heated reactant polymer, and is extremely sensitive and capable of continuous operation over a wide range of CO concentrations.

Having described several embodiments of a novel CO-measuring method and apparatus constructed in accordance with the invention, it is believed obvious that other modifications and variations of the invention are possible in the light of the above teachings. It is therefore to be understood that changes may be made in the particular embodiments of the invention described which are within the full intended scope of the invention as defined by the appended claims.

What is claimed is:

1. A method of detecting carbon monoxide in a sample gas comprising filtering a specimen portion of the sample gas to free it of condensation nuclei, reacting the carbon monoxide bearing gas specimen with a reactant polymer to induce thermoparticulate production of condensation nuclei by the polymer, and detecting the condensation nuclei thus produced to provide an indication of the carbon monoxide present in the sample gas.

2. A method according to claim 1 wherein the number of condensation nuclei produced and counted provides a measure of the quantity of carbon monoxide present in the sample gas.

3. The method according to claim 2 further including heating the reactant polymer.

4. The method according to claim 3 wherein the reactant polymer is heated to a temperature value just below that required for appreciable thermoparticulate production due to thermal agitation alone.

5. The method according to claim 4 further including controlling the temperature of the reactant polymer in accordance with the concentration of carbon monoxide present in the sample gas to thereby maintain the sensitivity of the measuring method over a wide range of concentrations.

6. A CO-measuring device for detecting carbon monoxide comprising sample inlet means for supplying a specimen of a sample gas to be monitored for carbon monoxide content, filter means supplied from said sample inlet means for freeing the specimen of sample gas from condensation nuclei, converter means containing polymeric material over which the filtered gas specimen is passed for reacting polymeric material with the filtered gas specimen supplied from the filter means to thereby produce condensation nuclei particles, and condensation nuclei meter means coupled to the output from said converter means for detecting the condensation nuclei particles produced by said converter means.

7. A CO-measuring device according to claim 6 wherein the condensation nuclei meter means provides an indication of the number of condensation nuclei particles produced and counted to thereby provide a measure of the quantity of carbon monoxide present in the sample gas.

8. A CO-measuring device according to claim 7 wherein the polymeric material is in the form of finely divided globular beads and the filtered gas specimen to be reacted is passed over the surface of the beads whereby surface exposure of the polymeric material to the gas specimen is maximized.

9. A CO-measuring device according to claim 8 wherein the polymeric material is from the group comprising styrene divinyl benzene copolymer, polyethylene, chlorinated polystyrene and copolymer of styrene.

10. A CO-measuring device according to claim 7 further including means for heating the polymeric material to a suitable reactant temperature.

11. A CO-measuring device according to claim 10 wherein the polymeric material is from the group comprising styrene divinyl benzene copolymer, polyethylene, chlorinated polystyrene and copolymer of styrene.

12. A CO-measuring device according to claim 11 wherein the polymeric material is from the group consisting of styrene divinyl benzene copolymer, polyethylene, chlorinated polystyrene and copolymer of styrene.

13. A CO-measuring device according to claim 12 wherein the polymeric material is in the form of finely divided globular beads and the filtered gas specimen to be reacted is passed over the surface of the beads whereby surface exposure of the polymeric material to the gas specimen is maximized.

14. A CO-measuring device according to claim 10 further including temperature control means for controlling the heating means to maintain the temperature of the polymeric material to a value just below that required for appreciable thermoparticulate production due to thermal agitation alone.

15. A CO-measuring device according to claim 14 wherein said condensation nuclei meter means includes indicator means for indicating the value of the particle count obtained by the condensation nuclei meter means, and further includes scale range changing means for adapting the indicator means to operate over a wide range of particle concentrations and hence serves to adapt the CO-measuring device to make it sensitive to a wide range of carbon monoxide concentrations.

16. A CO-measuring device according to claim 15 further including means interconnecting said temperature control means and the scale range changing means for automatically changing scale range with changes in temperature of the reactant polymeric material whereby for increasing CO concentrations the reactant temperature is lowered and the scale of the indicator means is adjusted to read higher CO concentrations.

* * * * *